(12) United States Patent
Fujii et al.

(10) Patent No.: US 6,397,667 B1
(45) Date of Patent: Jun. 4, 2002

(54) SURFACE PROPERTY MEASURING DEVICE

(75) Inventors: Nobuyoshi Fujii; Satoshi Ueda, both of Kure; Tamenori Shirai, Miyazaki-gun; Shinya Sasaki, Kure, all of (JP)

(73) Assignee: Mitutoyo Corporation, Kanagawa (JP)

( * ) Notice: Subject to any disclaimer, the term of this patent is extended or adjusted under 35 U.S.C. 154(b) by 0 days.

(21) Appl. No.: 09/210,987

(22) Filed: Dec. 15, 1998

(30) Foreign Application Priority Data

Dec. 26, 1997 (JP) ................................ 9-358884
Dec. 26, 1997 (JP) ................................ 9-358886

(51) Int. Cl.⁷ .......................... G01B 5/26; G01B 21/30
(52) U.S. Cl. ................................................ 73/105
(58) Field of Search ................................ 73/104, 105

(56) References Cited

U.S. PATENT DOCUMENTS

| | | | | |
|---|---|---|---|---|
| 3,621,580 A | * | 11/1971 | Tovaglieri | 33/555 |
| 3,852,601 A | * | 12/1974 | Casale | 250/366 |
| 3,996,669 A | * | 12/1976 | Anichini | 33/501.6 |
| 4,050,294 A | | 9/1977 | Andrew et al. | 73/105 |
| 4,146,966 A | * | 4/1979 | Levine et al. | 33/24.2 |
| 4,149,317 A | * | 4/1979 | Reiff et al. | 33/1 M |
| 4,282,654 A | * | 8/1981 | Reiff et al. | 33/1 M |
| 4,366,624 A | * | 1/1983 | Bergstrom | 33/600 |
| 4,790,078 A | * | 12/1988 | Schneider | 33/503 |
| 4,845,855 A | * | 7/1989 | Meyer | 33/832 |
| 5,068,972 A | * | 12/1991 | Herzog et al. | 33/503 |
| 5,142,790 A | * | 9/1992 | Raho | 33/503 |
| 5,724,745 A | * | 3/1998 | Brenner | 33/503 |
| 5,740,616 A | * | 4/1998 | Seddon et al. | 33/554 |

FOREIGN PATENT DOCUMENTS

| | | | | |
|---|---|---|---|---|
| DE | 2655049 | * | 6/1978 | |
| DE | 31 47 354 A1 | | 6/1983 | |
| DE | 3623362 A1 | * | 1/1988 | 33/710 |
| DE | 3722876 A1 | * | 1/1989 | 33/666 |
| DE | 41 32 724 A1 | | 4/1993 | 73/105 |
| DE | 44 37 033 A1 | | 4/1996 | |
| JP | A-61-155701 | | 7/1986 | 33/203 |
| JP | A-61-155901 | | 7/1986 | 33/203.13 |
| JP | U-1-104504 | | 7/1989 | |
| JP | B2-3-30084 | | 4/1991 | |
| JP | Y2-4-24408 | | 6/1992 | |
| JP | 4-215012 | * | 8/1992 | G01B/21/04 |
| JP | B2-4-60523 | | 9/1992 | |
| JP | A-6-258003 | | 9/1994 | |
| JP | A-8-503311 | | 4/1996 | |

* cited by examiner

*Primary Examiner*—Thomas P. Noland
(74) *Attorney, Agent, or Firm*—Oliff & Berridge, PLC

(57) ABSTRACT

A surface property measuring device includes a detector having a stylus, and a driving mechanism for causing the detector to advance and retreat along a surface to be measured. The measuring device further comprises a main shaft fixed to a frame of the driving mechanism in parallel with an advancing and retreating direction of the detector, and a slide block which is shaped like a rectangle in the advancing and retreating direction of the detector, sliding on the main shaft, the main shaft being inserted through two of a fore and a rear portion of the slide block. This results in improvement of the straightness accuracy in the movement of the detector, and reduces the cost while stabilizing the measurement accuracy.

10 Claims, 18 Drawing Sheets

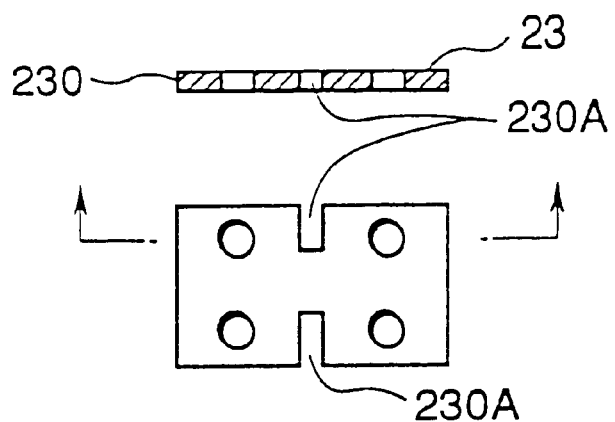
FIG.17a
FIG.17b
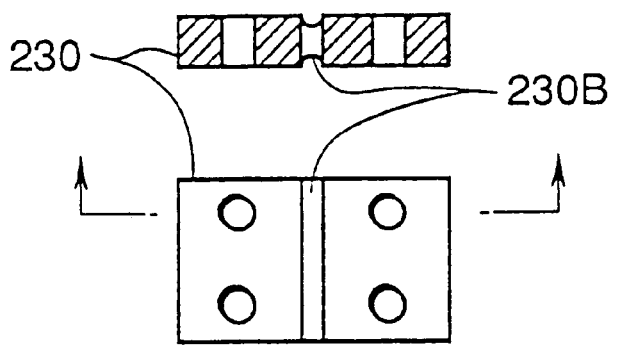
FIG.18a
FIG.18b
FIG.19
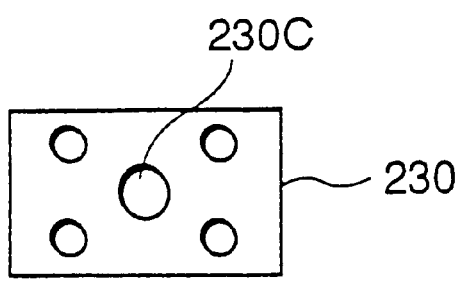

SURFACE PROPERTY MEASURING DEVICE

BACKGROUND OF THE INVENTION

1. Field of the Invention

The present invention relates to a surface property measuring device comprising a detector having, a stylus for measuring surface property, typically, surface roughness, and a driving mechanism for causing the detector to advance and retreat along a surface to be measured, more particularly to a surface property measuring device which is superior in straightness and reproducibility exhibited when the detector advances and retreats, and which is low in cost., Further, the present invention relates to a surface property measuring device comprising a detector having a stylus arm provided with the stylus in the vicinity of a leading end thereof, and more particularly to a surface property measuring device comprising a detector which is capable of measuring micro surface property by a low measuring force.

2. Description of the Prior Art

There has been widely used a surface roughness measuring device of applying a stylus on a surface to be measured, and measuring the surface roughness by detecting a surface roughness-direction-wise displacement of the stylus while advancing and retreating a detector including the stylus along the surface to be measured, to thereby convert the detected displacement into an electrical signal and then process the electrical signal in a predetermined manner.

There have been proposed various driving mechanisms for causing the detector to advance and retreat along the surface to be measured.

For example, there is, as shown in FIG. 22, described in Japanese Patent Publication (Kokoku) No. 4-60523 a surface roughness measuring device comprising a sliding shaft 34 held on a bearing 33, which is disposed on a frame 32 of the driving mechanism, and sliding in an advancing and retreating, direction (in the direction shown by the arrow A) of a detector 10, a driving-side connector 40 attached to the sliding shaft 34 through a moving block 36 and a leaf spring 38, a feed block 44 fixed to the sliding shaft 34 through a connecting portion 42 for causing the sliding shaft 34 to advance and retreat in the direction shown by the arrow A, a feed screw 46 engaged with the feed block 44, a reduction gear 50 connected to the feed screw 46 through a coupling 48, and a motor 52 for rotation-driving the reduction gear 50.

In FIG. 22, reference numeral 14 designates a detector-side connector pin attached to a rear end (on the right-hand end of the drawing) of a case 12 of the detector 10 and engaged with the driving-side connector 40, 18 a stylus arm having a stylus 16, which moves up and down while following the surface to be measured, at a leading end thereof (on the left-hand end of the drawing) and swinging in the case 12 with a fulcrum (20) as a center, 20 a leaf spring shaped like a substantially L, constituting the fulcrum of the stylus arm 18, 22 an inductance type displacement detector disposed in the vicinity of a rear end of the stylus arm 18 for detecting an up-and-down movement of the rear end of the stylus lever 18, 24 a skid for absorbing minute irregularities in the vicinity of the stylus 16 to thereby obtain a stable measured value, and 26 a nose for protecting the stylus 16 and the stylus arm 18.

This Japanese Patent Publication (Kokoku) No. 4-60523 aims to propose a compact stationary surface roughness measuring device. However, it has a construction in which the sliding shaft 34 itself advances and retreats in the frame 32 of the driving mechanism 30 in the direction shown by the arrow A, thereby disabling the sliding shaft 34 to be elongated so much, which causes the moving stroke of the detector 10 to be placed under restriction. Furthermore, the sliding shaft 34 as a moving part is connected to the detector 10 through the moving block 36, the leaf spring 38, the connector 40, and so on, thereby making the bearing 33 susceptible to the external force, which provides problems of making it difficult to maintain a stable and highly accurate straightness, and so on.

On the other hand, the applicant proposes in, Japanese Provisional Patent Publication (Kokai) Nos. 61-155901 and 61-155701 a stylus type measuring device in which, as its main part is shown in FIG. 23, a guide shaft 54 is fixed to a frame of a driving mechanism (not shown) in parallel with an advancing and retreating direction of a detector, 10 (in a lateral direction of the drawing), and the detector 10 is attached to a feed nut 45 which slides on the guide shaft 54 and is moved by a feed screw 46 rotated by a motor 52.

In. FIG. 23, reference numeral 16 is a stylus, 56 a slide rod fixed to the feed nut 45, 58 a vertical guiding member vertically connected to a leading end of the slide rod 56, 60 is a sliding member attached to the vertical guiding member 58 slidably up and down, 62 a holding member to hold the detector 10 rotatably attached to the sliding member 60, 64 a switch pin fixed to the feed nut 45, and 66, 68 are a fore end and a rear end limit switch which turn on at an advancing limit position (hereinafter referred to as "the fore end") or an retreating limit position (hereinafter referred to as "the rear end").

However, also the stylus type measuring device, proposed in Japanese Provisional Patent Publication (Kokai) Nos. 61-155901 and 61-155701 cannot sufficiently secure a span of the feed nut 45 to the guide shaft 54; therefore, not only the feed nut 45 is easily susceptible to the external force, but also it undergoes a large saccadic movement due to the dimension error of the component, which does not makes it easy to maintain a stable and highly accurate straightness.

Besides, the applicant proposes in Japanese Utility Model Publication (Kokoku) No. 4-24408 a surface roughness measuring device in which, as its main part is shown in FIG. 24, a guide 'shaft 54, is fixed to a frame 32 of a driving mechanism 30 in parallel with an advancing and retreating direction of the detector 10 (in a lateral direction of the drawing), and the detector 10 is attached to one of a pair of movable pieces 70, 72 (the movable piece 70 in the drawing) which are moved by a feed screw 46 rotated by a motor 52.

In FIG. 24, reference numeral 74 designates a pair of tension springs for urging both the movable pieces 70, 72 in the direction nearer to each other to thereby eliminate the backlash.

However, also the surface roughness measuring device proposed in Japanese Utility Model Publication (Kokoku) No. 4-24408 has the same problems as Japanese Provisional Patent Publication (Kokai) Nos. 61-155901 and 61-155701.

On the other hand, there is described in Japanese Provisional National Publication (Kohyo) No. 8-503311 that a slide rod, to which a detector is attached, is positioned by being pressed obliquely on to an L-like slide surface in a driving mechanism by a leaf spring, a driving belt is engaged between pulleys disposed in the vicinities of a fore and a rear end of the driving mechanism, respectively, the slide rod is fixed to a part of the belt, and the rotation of the pulleys causes a detector, attached to a leading end of the slide rod, to retreat. The device proposed therein has a large saccadic movement due to the dimension error of the component, which makes it difficult to maintain. a stable and highly accurate straightness.

Furthermore, according to any one of the prior arts, the wire to the detector 10 in the driving mechanism 30 is made of a lead wire; therefore, according to the kind of the wire or the wiring manner of the wire, a part of the wire easily undergoes excessive bending, an unstable load, or the like is applied to a connector with the detector and a driving mechanism such as a sliding member, which provides a bad influence to the straightness and the reproducibility.

Besides, there are proposed, as a mechanism for supporting a stylus arm 18 in the detector 10 and providing a measuring force thereto, not only a mechanism provided with one leaf spring 20 having both of a function as a fulcrum and a function of providing a measuring force, as shown in Japanese Patent Publication (Kokoku) No. 4-60523, but also a mechanism in which, as proposed in Japanese Patent Publication (Kokoku) No. 3-30084 and Japanese Provisional Patent Publication (Kokai) No. 6-258003, a coil spring 86 is, as shown in FIG. 25, disposed in a tension manner between a location slightly apart from a bearing portion 82 of an arm holder 80 holding a stylus arm 18 and a measuring force-adjusting screw 84 attached to a case 12 (Japanese Patent Publication (Kokoku) No. 3-30084), or a slider adjusted in location by a screw rod (Japanese Provisional Patent Publication (Kokai) No. 6-258003), one end of the coil spring 86 is adjusted in location in the direction shown by the arrow B by the measuring force adjusting screw 84 or the slider, which provides a measuring force while absorbing the backlash of the bearing portion 82.

The applicant proposes in Japanese Provisional Utility Model Publication (Kokai) No. 1-104504 that two coil springs 92, 94 provide, as shown in FIG. 26, a minute measuring force to a stylus arm 18 supported by a cross-like spring 90.

However, the mechanism using a bearing, proposed in Japanese Patent Publication (Kokoku) No. 3-30084 and the mechanism using two coil springs, proposed in Japanese Provisional Utility Model Publication (Kokai) No. 1-104504, have many components, which provides a problem that the assembling and the adjustment are difficult. In particular, the mechanism which eliminates the backlash of the fulcrum and adjusts the measuring force by one coil spring, proposed in Japanese Patent Publication (Kokoku) No. 3-30084, makes it difficult to set the optimum points of the both.

On the other hand, as proposed in Japanese Patent Publication (Kokoku) No. 4-60523 and Japanese Provisional Utility Model Publication. (Kokai) No. 1-104504, when the fulcrum is formed by the leaf spring, the fulcrum is fixed by the leaf spring, thereby preventing the fulcrum shaft from shifting, which provides a stable accuracy. However, as proposed in Japanese Patent Publication (Kokoku) No. 4-60523, when the leaf spring is independently used, there is a problem that the change of the thickness or the bending of the leaf causes the measuring force to be changed, which makes the adjustment difficult.

Furthermore, a special detector such as a deep-slot-use prove detector having a long stylus has a problem that the change of the weight of the stylus arm causes the measuring force to change.

SUMMARY OF THE INVENTION

The present invention has been made in order to solve the above-mentioned conventional problems. It is therefore a first object of the present invention to make the sliding member not to be affected by the external force, and then reduce the saccadic movement of the sliding member due to the dimension error, thereby stably being affected by a straightness with high accuracy at a low cost.

It is a second-object of the invention to prevent the detector, the connector, and the sliding section from receiving an unstable load, and then prevent the straightness and the reproducibility from being affected by a bad influence.

It is a third object of the invention to make the measuring force accurately adjustable by means of a simple construction.

The invention of claim 1 provides a surface property measuring device comprising a detector having a stylus, and a driving mechanism for causing the detector to advance and retreat along a surface to be measured, wherein the device comprising a columnar guide fixed to a frame of the driving mechanism in parallel with an advancing and retreating direction of the detector, a sliding member sliding on the columnar guide, elongated in the advancing and retreating direction of the detector, and engaged with the columnar guide at least two of a fore and a rear location thereof, and driving means for causing the sliding member to advance and retreat along the columnar guide, and wherein the detector is attached to the sliding member, which results in solution of the above-mentioned first object.

According to the invention of claim 1, the columnar guide can be elongated, and portions of the sliding member for receiving the sliding portion can be arranged with its span wide, which makes the sliding member not to be affected by the external force, and then reduces the saccadic movement of the sliding member due to the dimension error, thereby stably providing a straightness with high accuracy at a low cost. This results in improvement of the reproducibility and stabilization of the accuracy, and then reduces the number of the components and facilitates the assembling, with low cost.

In the invention, the columnar guide is provided in plural, and one of the columnar guides is inserted through the sliding member, whereas the others of the columnar guides is adapted to press the sliding member, so as to obtain more stability.

In the invention, the sliding member is rectangular and is elongated in the advancing and retreating direction of the detector, and the one of the columnar guides is inserted through two of the fore and the rear location.

In the invention of claim 2, the detector is detachable to the driving mechanism through connectors, wherein a driving-side connector is fixed to the sliding member.

In the invention of claim 3, at least a portion of a cable, which connects the driving mechanism with the detector, to be deformed due to a movement of the detector comprises a flexible printed circuit board, which results in solution of the above-mentioned second object.

The invention of claim 4 provides a surface property measuring device comprising a stylus arm having a stylus at the vicinity of a leading end thereof, wherein a fulcrum of the stylus arm is made of a thin plate, and the stylus arm is applied with a force directed in such a direction as to cause the stylus to contact to a surface to be measured, by means of a coil spring which is independent of the thin plate, which results in solution of the above-mentioned third object.

According to the invention of claim 5, no bearing is used, thereby reducing the number of the components and making the assembling and the adjustment easy, with low cost. Also, the fulcrum is fixed using the thin plate, thereby preventing the fulcrum shaft from shifting, with stabilized accuracy.

Further, when the leaf spring is independently used, the thickness change and the bend of the leaf causes the measuring force to be changed, thereby making the adjustment difficult; however, the invention of claim 4 is capable of setting the measuring force in designing, and easily adjusting the measuring force. Moreover, when eliminating the saccadic movement of the fulcrum and simultaneously adjusting the measuring force are carried out by only one leaf spring, the thickness change and the bend of the leaf, and the like provide a large fluctuation, thereby making it difficult to set the optimum points of both of eliminating the saccadic movement and adjusting the measuring force. However, according to the invention of claim 4, no saccadic movement initially occurs on the fulcrum, the coil spring has only to be adjusted taking account of the optimum measuring force only, which makes it easy to adjust the measuring force.

In a special detector such as a deep-slot-use detector having a long stylus, if the weight of the stylus arm is changed, the dispersion of the measuring force among the products can be lowered by changing the thickness and the shape of the leaf spring and simultaneously adjusting the urging force of the coil spring.

In the invention of claims 5 and 6, the thin plate is more different (weaker) in elastic force in the vicinity of the fulcrum than at the other portions, so as to reduce fluctuations in position of the fulcrum.

In the invention of claim 7, the thin plate is shaped like a cross and fixed to a frame of the detector at both end portions thereof, and a stylus arm is fixed to a center portion of the thin plate, so as to prevent fluctuations in position of the fulcrum.

In the invention of claim 10, an urging force of the coil spring is adjustable.

In the invention of claims 8 and 9, the thin plate comprises a leaf spring, and the leaf spring provides a reaction force which is opposed to an urging force by the coil spring, and the balance between the reaction force and the urging force by the coil spring provides a measuring force to the stylus, which provides a minute measuring force with high accuracy.

These and other novel features and advantages of the present invention are described in or will become, apparent from the following detailed description of preferred embodiments.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 17a is a sectional view of a variant example of a fulcrum leaf spring, and

FIG. 17b is a plan view of the same;

FIG. 18a is a sectional view of another variant example of the fulcrum leaf spring, and FIG. 18b is a plan view of the same;

FIG. 19 is a plan view of still another variant example of the fulcrum leaf spring;

DESCRIPTION OF THE PREFERRED EMBODIMENTS

Embodiments of the invention applied to a stationary portable surface roughness measuring device will be described hereinafter with reference to the drawings.

Figure 1:
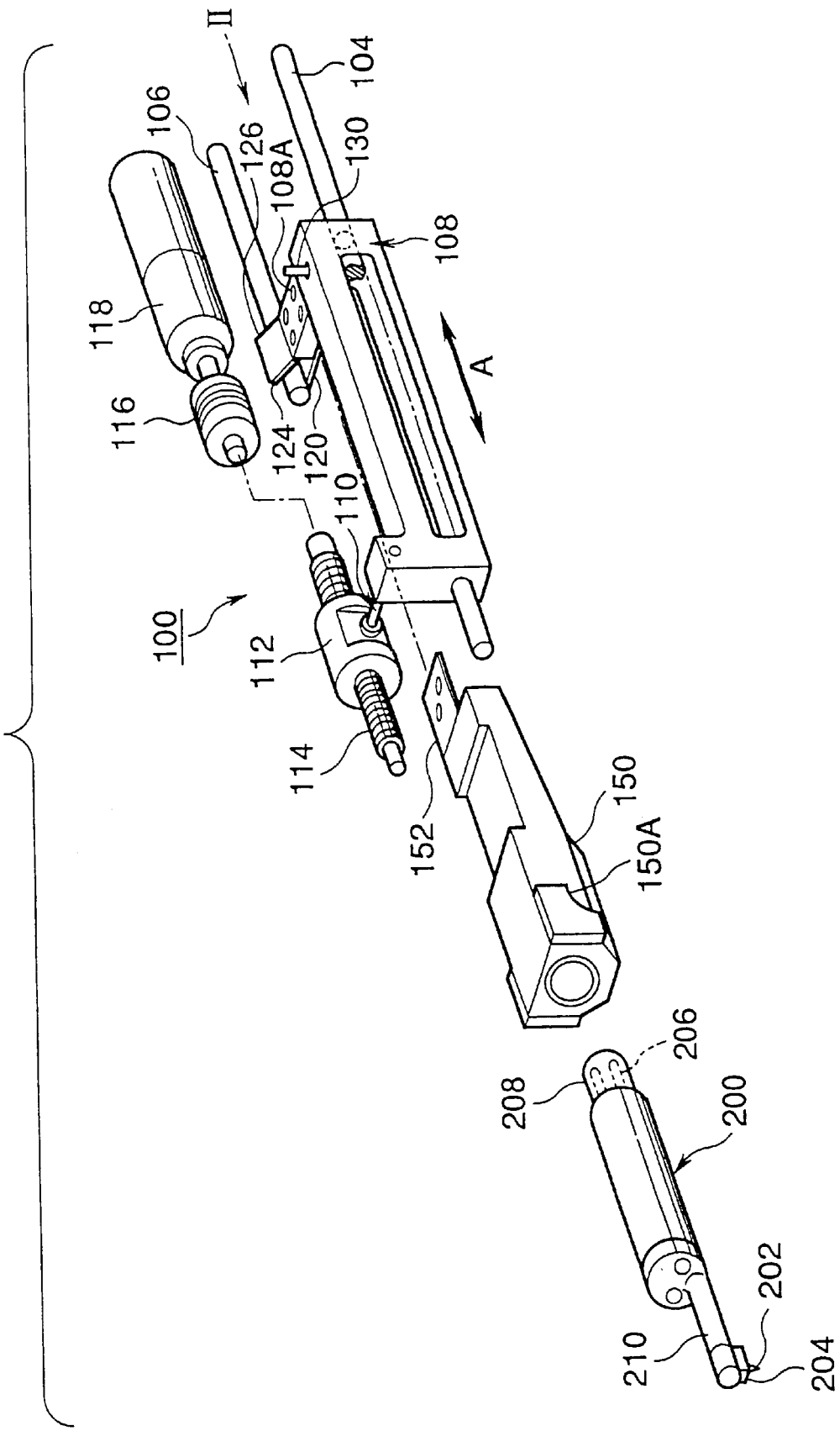
FIG. 1 is a perspective view showing the construction of a main part of a first embodiment of the present invention.
Figure 2:
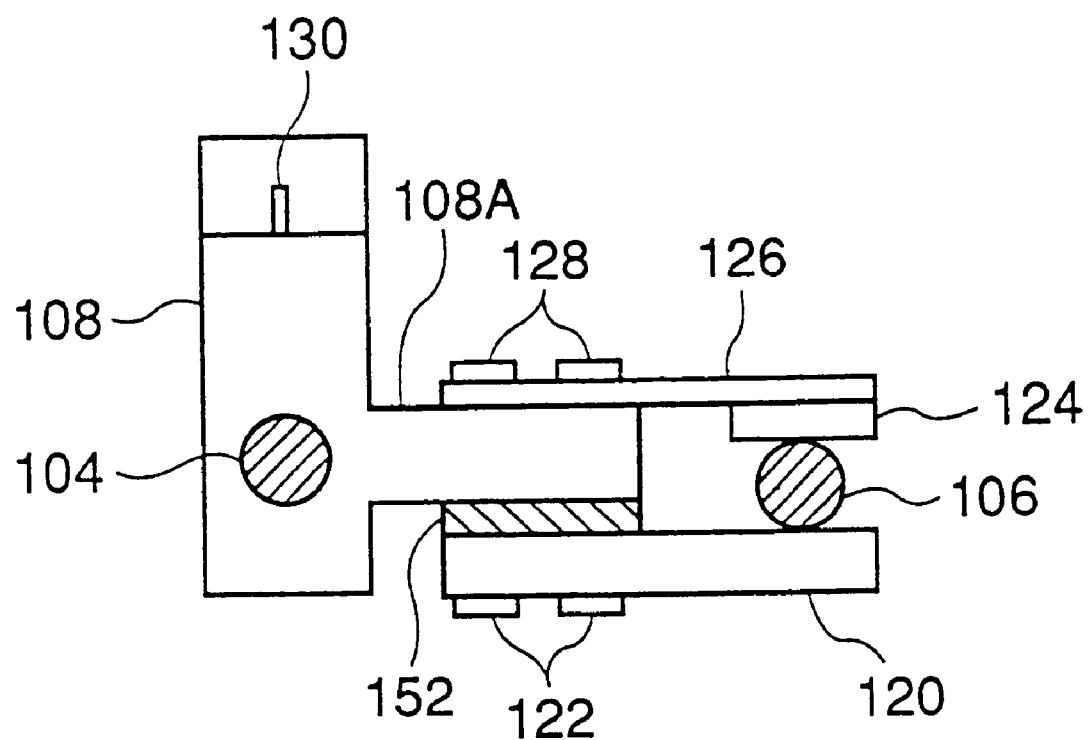
FIG. 2 is a side view viewed from the direction shown by the arrow II in FIG. 1.
Figure 3:
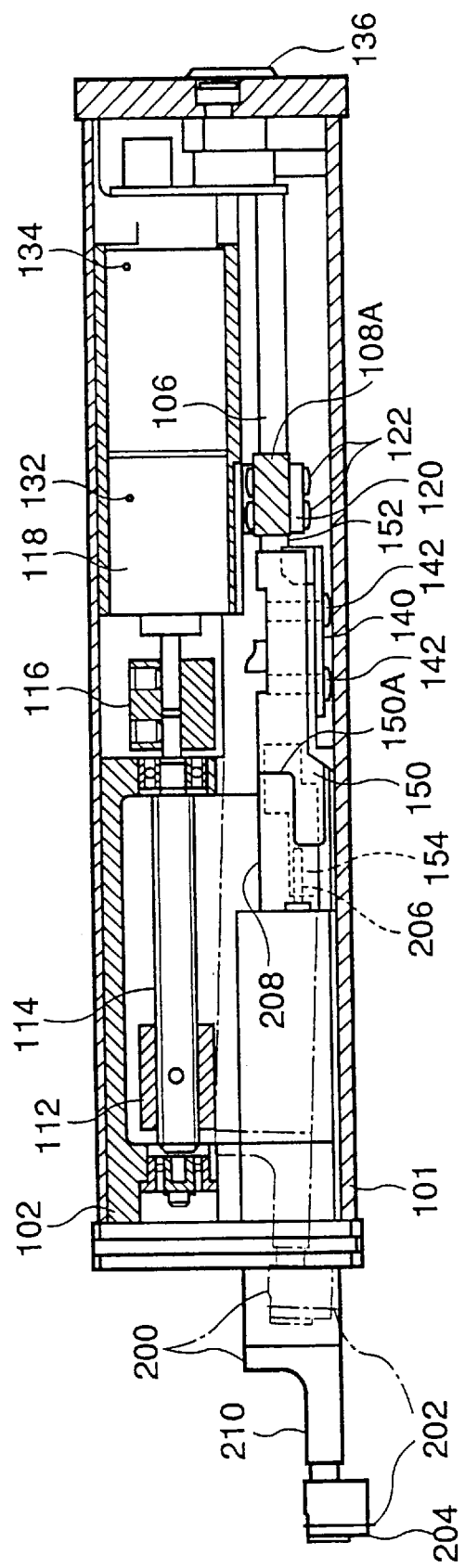
FIG. 3 is a longitudinal sectional view, viewed from its front, of a driving mechanism to which a detector according to the first embodiment is attached.
Figure 4:
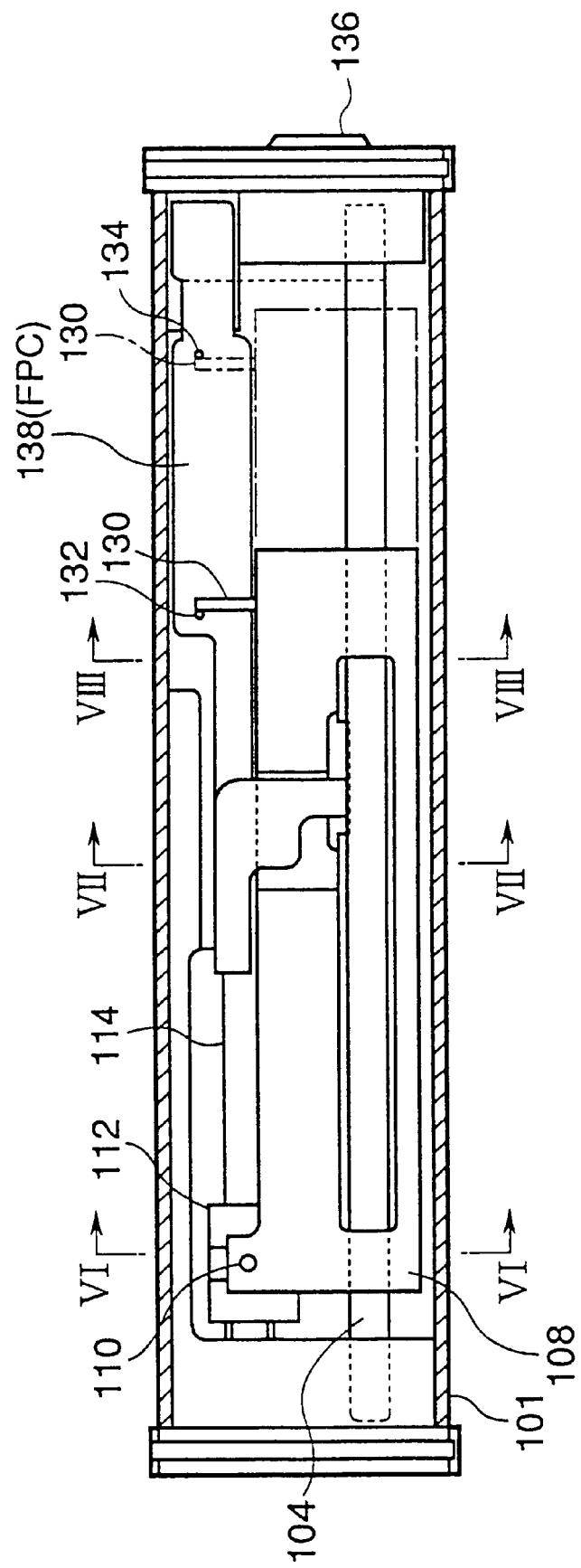
FIG. 4 is a longitudinal sectional view of the same viewed from above.
Figure 5:
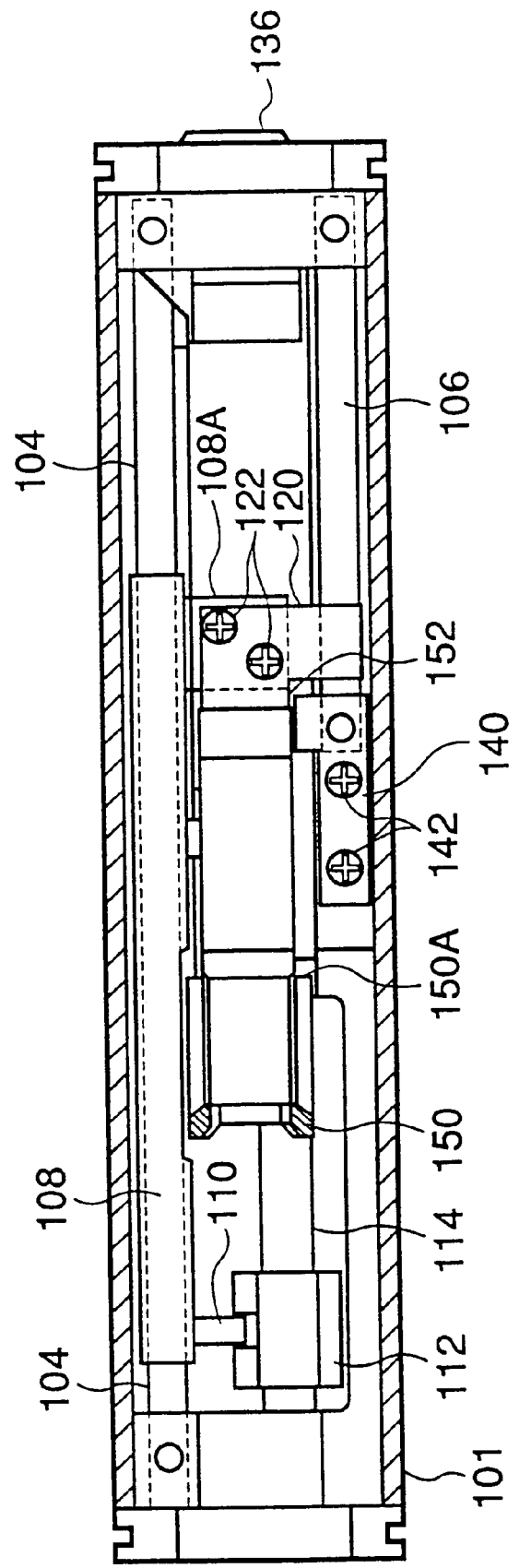
FIG. 5 is a longitudinal sectional view of the same viewed from the bottom.
Figure 6:
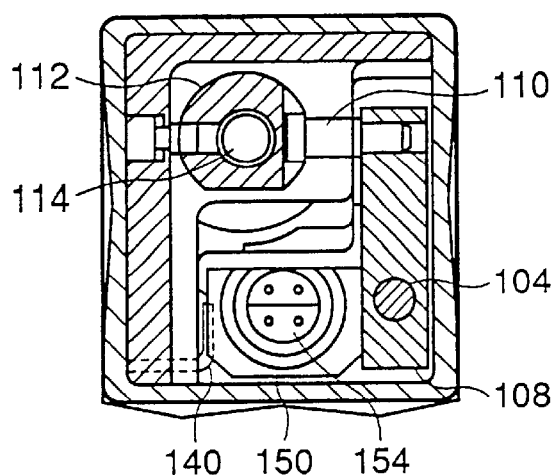
FIG. 6 is a lateral sectional view taken on the line VI—VI in FIG. 4.
Figure 7:
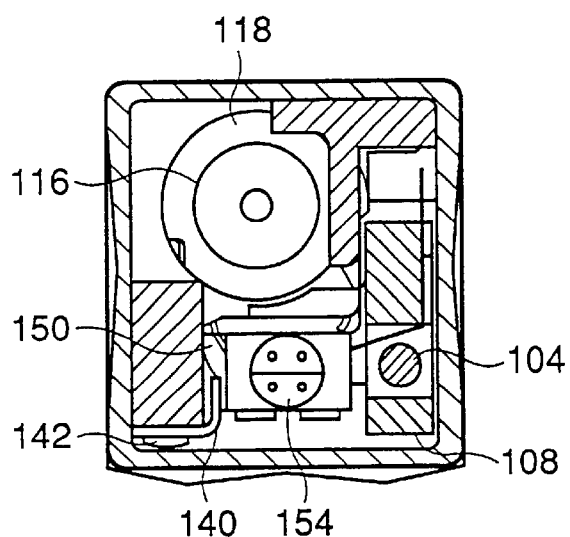
FIG. 7 is a lateral sectional view taken on the line VII—VII in FIG. 4.
Figure 8:
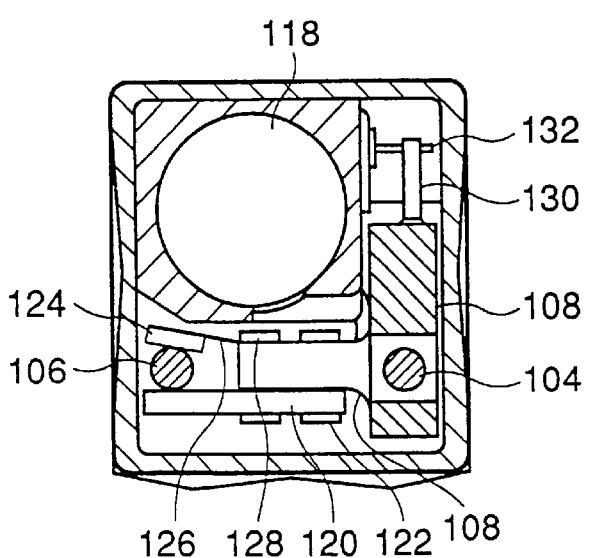
FIG. 8 is a lateral sectional view taken on the line VIII—VIII in FIG. 4.

FIG. 1 is a perspective view showing the construction of a main part of a first embodiment of the present invention; FIG. 2 is a side view viewed. from the direction shown by the arrow II in FIG. 1; FIG. 3 is a longitudinal sectional view, viewed from its front, of a driving mechanism to which a detector according to a first embodiment is attached; FIG. 4 is a longitudinal sectional view of the same viewed from above; FIG. 5 is a longitudinal sectional view of the same viewed from the bottom; FIG. 6 is a lateral sectional view taken on the line VI—VI in FIG. 4; FIG. 7 is a lateral sectional view taken on the line VII—VII in FIG. 4; and FIG. 8 is a lateral sectional view taken on the. line VIII—VIII in FIG. 4.

A driving mechanism 100 according to the present embodiment comprises a main shaft (columnar guide) 104 and a sub shaft (columnar guide) 106 which are fixed to a frame 102 of the driving mechanism 100, a slide block (sliding member) 108, which is rectangular and elongated in an advancing and retreating direction (in the direction shown by the arrow A) of a detector, sliding on the shafts 104, 106, the main shaft 104 being inserted through two of a fore and a rear location thereof, an interlinking rod 110 and a feed nut 112 causing the slide block 108 to advance and retreat along the shafts 104, 106, a feed screw 114 screwed with the feed nut 112, and a gear motor 1 18 for rotating the feed screw 114 through a flexible coupling 116.

As shown in FIG. 2 in detail, a detector mount 108A is formed on a rear end of the slide block 108, and to a lower side of the slide block 108 are fixed by bolts 122 both of a leaf spring 152 attached to a rear end of a connector housing 150 for containing a detector 200, for providing a skid pressure, and a shaft supporting plate 120 for pressing a lower surface of the sub shaft 106. Further, a leaf spring 126, on which a sliding plate 124 for pressing an upper side of the sub shaft 106, is fixed on an upper side of the detector mount 108A through bolts 128.

In FIGS. 1 to 3; reference numeral 101 designates a case of a driving mechanism 130; a switch pin uprightly planted on the slide block 108; 132 and 143 a fore and a rear end switch engaging with the switch pin 130 to stop or reverse the gear motor 118; 140 a detector lift plate fixed to the frame 102 through a bolt 142 for engaging with an angle-like protrusion 150A formed outside the connector housing 150 in the vicinity of a retreating limit position of the detector 200 to lift the detector 200, thereby preventing a stylus 202 and a skid 204 from protruding downward a bottom surface of the driving mechanism 100; 154 a driving-side connector contained in the connector housing 150;206 a detector-side connector pin inserted into the driving-side connector 154; 208. a connector housing of the detector, and 210 a nose of the same.

Figure 13:
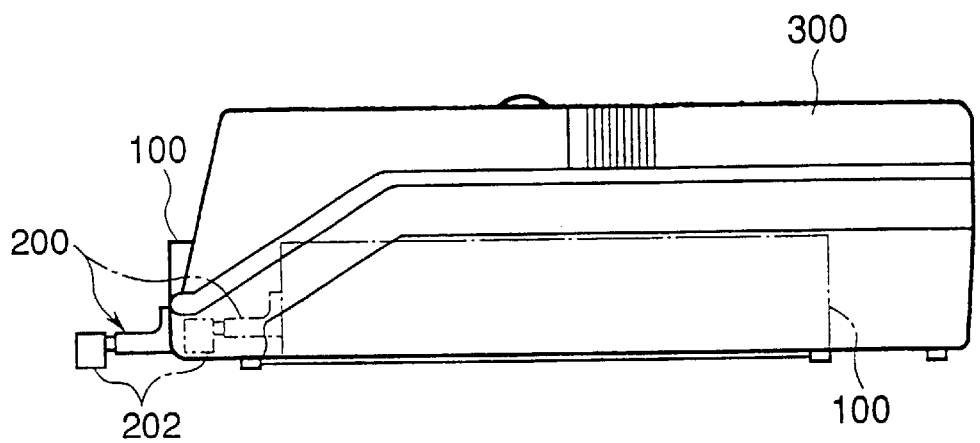
FIG. 13 is a front view showing a state in which the driving mechanism of the first embodiment is contained in an electrical equipment section.
Figure 14:
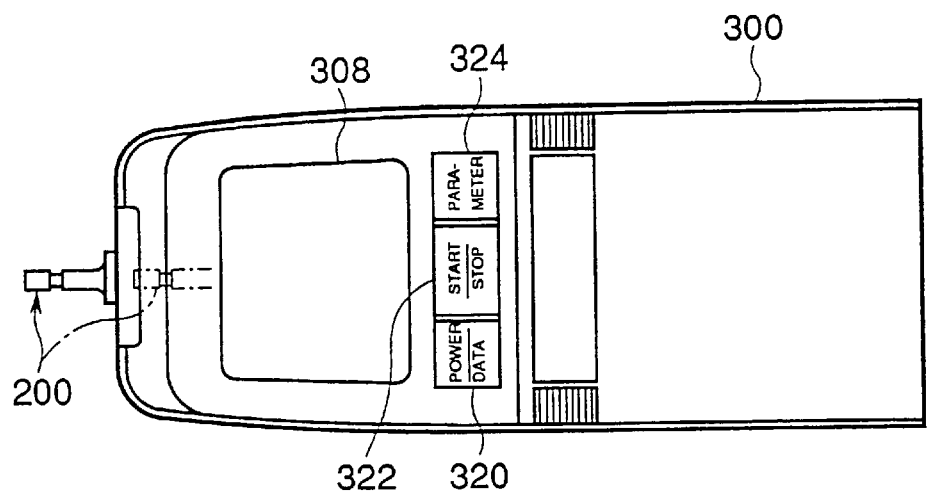
FIG. 14 is a plan view of the same.
Figure 15:
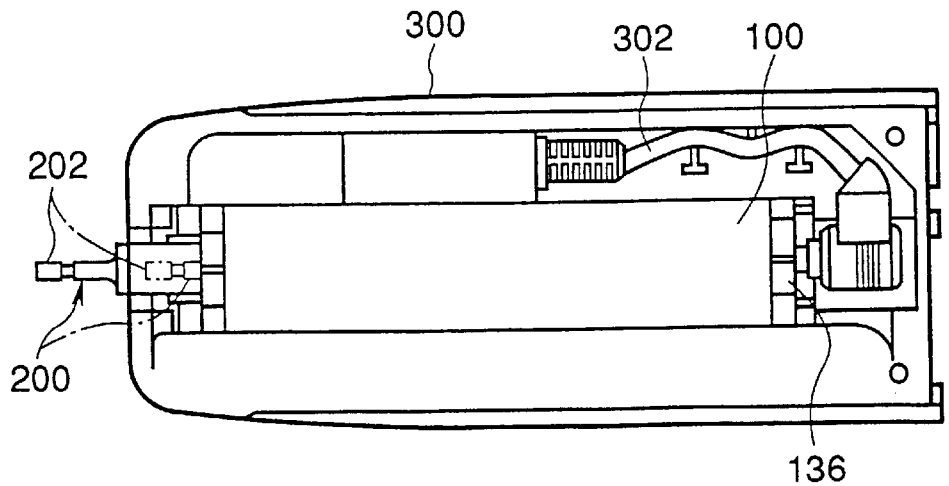
FIG. 15 is a bottom view of the same.

The driving mechanism 100 can be contained in an electrical equipment section 300, as shown in FIGS. 13 to 15 described later. On a rear end of the driving mechanism 100 is disposed an electrical equipment-side connector 136 electrically connected to the electrical equipment section 300, and a portion between the electrical equipment-side connector 136 and the driving-side connector 154 is wired by a thin flexible printed circuit substrate (FPC) 138, having a thickness of, e.g. about 0.2 mm, through the connector housing 150.

Figure 9:
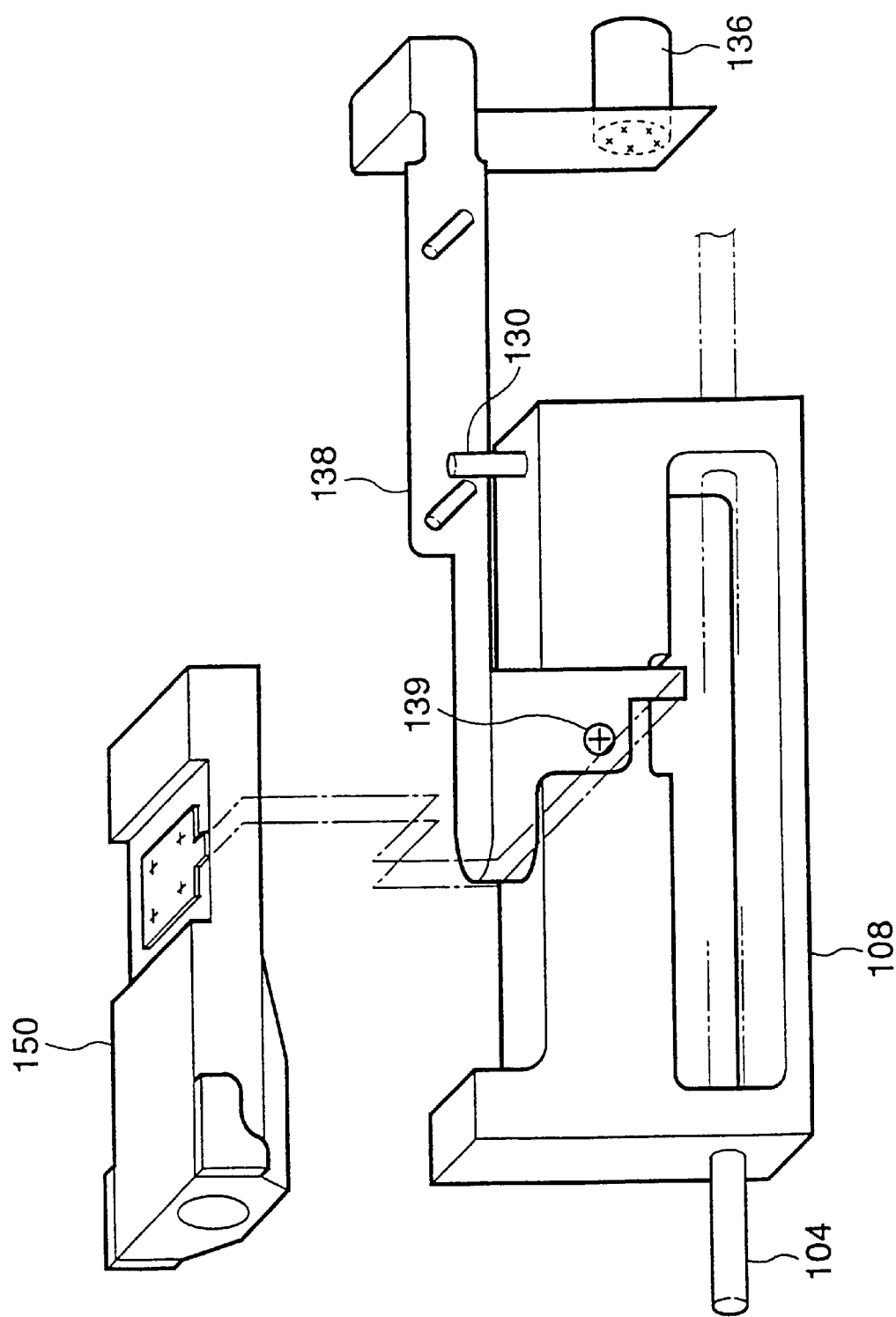
FIG. 9 is a perspective view showing a state off assembling a flexible printed circuit board used in the first embodiment.

The flexible printed circuit substrate 138 is, as shown in FIG. 9, fixed to the connector housing 150 and the electrical equipment-side connector 136 by the soldering at both ends thereof, fixed to the slide block 108 by the screw 139 at an intermediate, portion, and then contained in the driving mechanism 100 in a U-like sagged manner, thereby causing the change of the wire length due to the movement of the connector 154 to be absorbed, which prevents the detector 200 from receiving the tension even if the connector housing 150 (detector 200) is moved.

Figure 10:
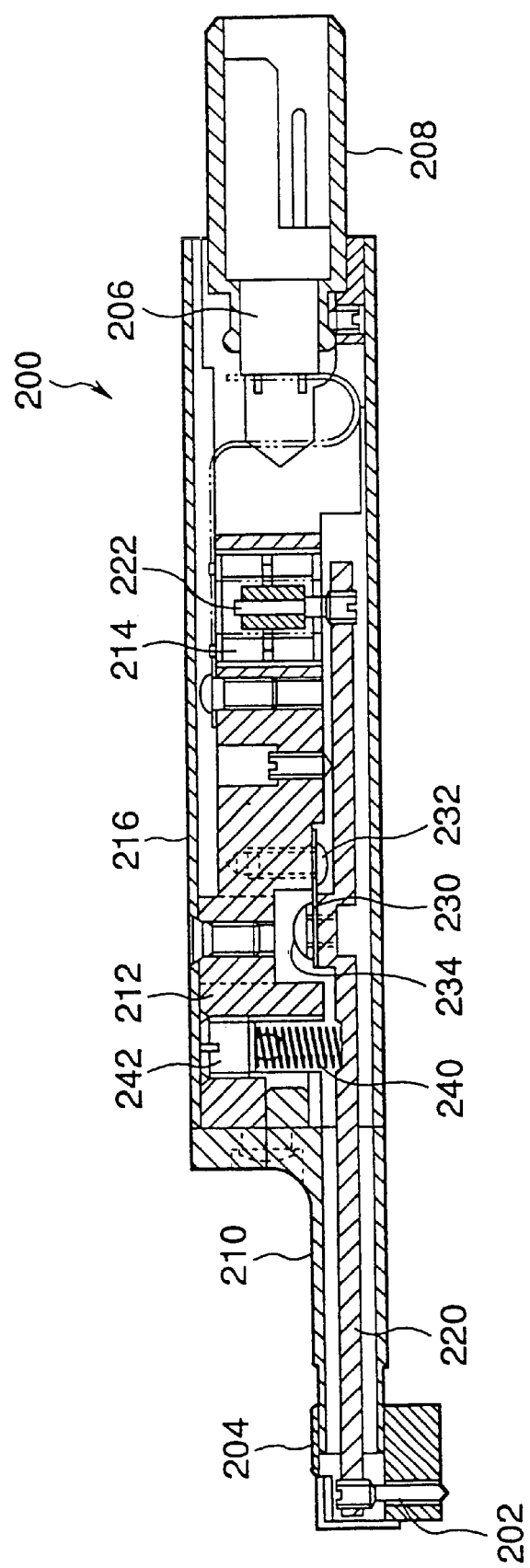
FIG. 10 is a longitudinal sectional view showing the construction of the detector of the first embodiment.
Figure 11:
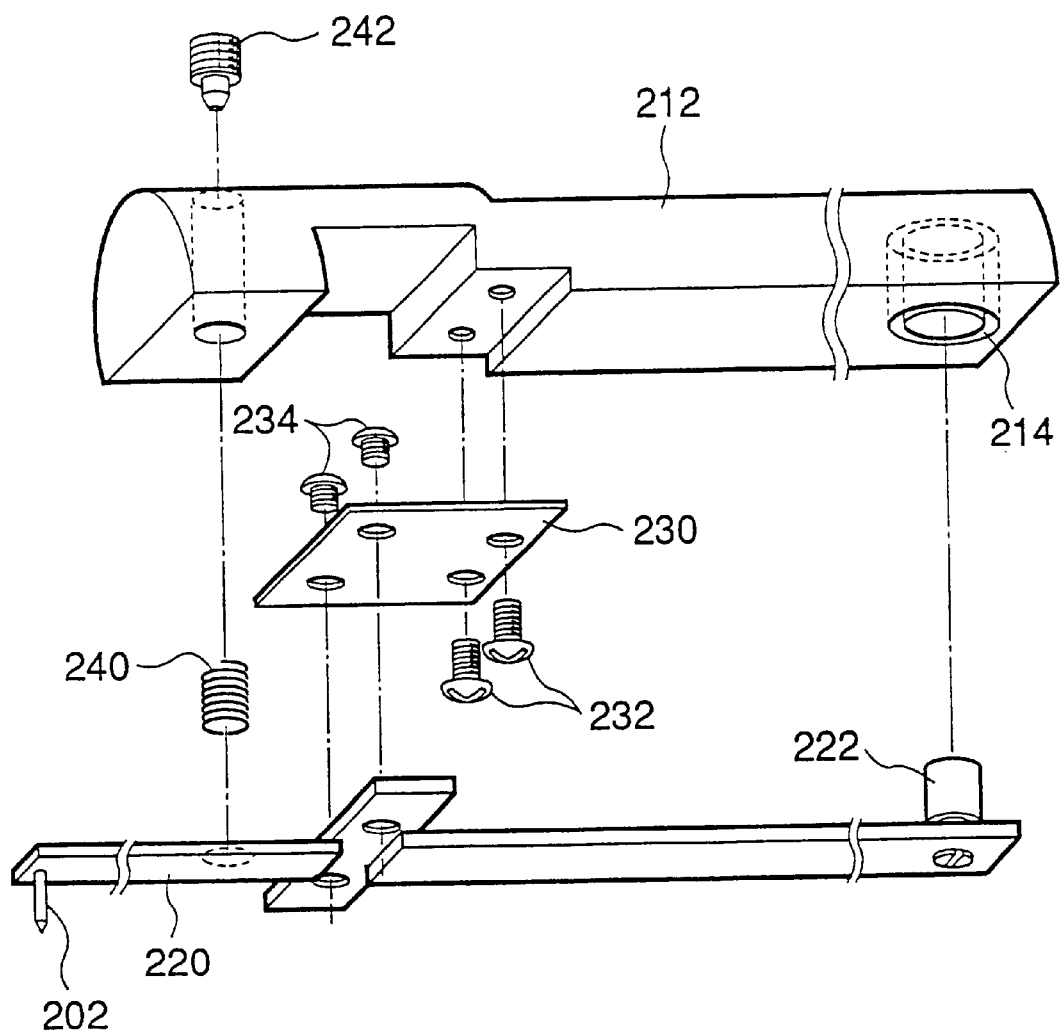
FIG. 11 is an exploded perspective view, viewed obliquely from below, showing the internal construction of the same.
Figure 12:
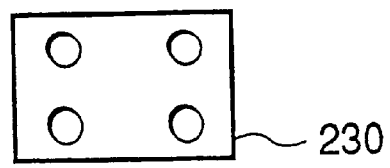
FIG. 12 is a plan view showing the shape of a fulcrum leaf spring used in the first embodiment.

The detector 200,mainly comprises, as shown in FIG. 10 (longitudinal sectional view) and FIG. 11 (exploded perspective view viewed obliquely from below), a main body frame 212 having a displacement-detecting bobbin 214 at a rear end thereof, a stylus arm 220 having a surface roughness-measuring stylus 202 in the vicinity of a leading end thereof and a displacement-detecting core 222 in the vicinity of a rear end thereof, a plane shaped fulcrum leaf spring 230, shown in FIG. 12, for fixing a central portion, for example, of the stylus arm 220 to the main body frame 212, a coil spring 240 for applying a force, which is directed in such a direction (downward direction in FIG. 9) as to contact the stylus 202 to a surface to be measured, to the stylus arm 220, and a spring pressing screw 242 for adjusting an urging force due to the coil spring 240.

The fulcrum leaf spring 230 is fixed to the main body frame 212 by screws 232, and fixed to the stylus arm 220 by screws 234.

In FIG. 10, reference numeral 216 designates a cover.

Figure 16:
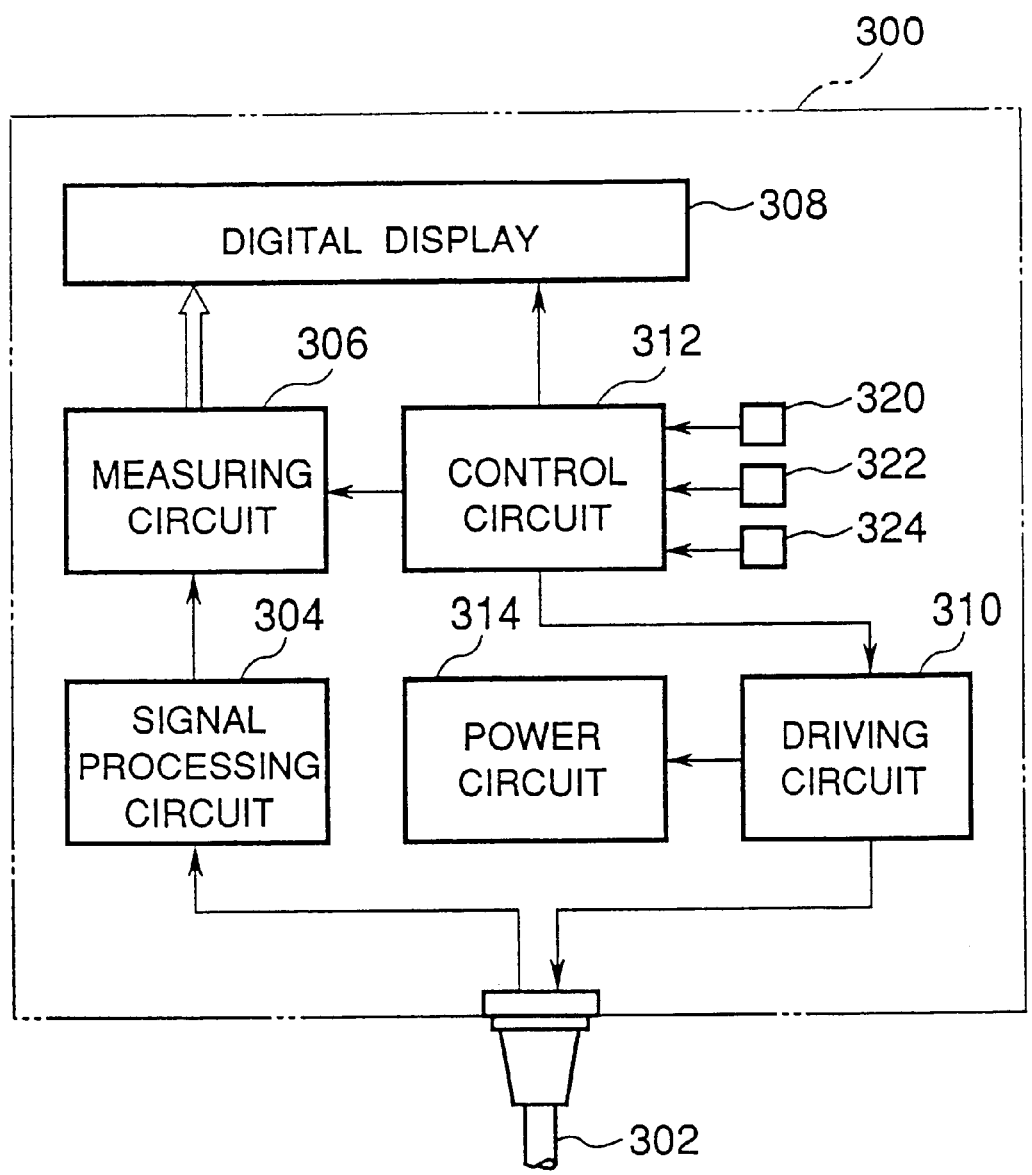
FIG. 16 is a block diagram showing the construction of the electrical equipment section.

The electrical equipment section 300 mainly comprises, as shown in FIG. 13 (front view), FIG. 14 (plan view), FIG. 15 (bottom view); and FIG. 16 (block diagram), a signal processing circuit 304 for processing a signal, which is obtained from the detector 200 contained in the driving mechanism 100, through a cable 302 connected with the electric equipment-side connector 136, a measuring circuit 306 for obtaining a surface roughness corresponding to various kinds of parameters based on the signal from, the signal processing circuit 304, a digital display 308 for displaying the measured value obtained by the measuring circuit 306, a driving circuit 310 for driving the gear motor 118 in the driving mechanism 100 through the cable 302, a control circuit 312 for controlling the driving circuit 310, the measuring circuit 306, and the digital display 308, and an electric power circuit 314 for supplying an electric power to the above respective circuit.

The solid line in the drawing shows the position of a leading end of the detector 200 exposed when measuring, and the one dot chain line shows the, position of the leading end of the detector 200. exposed when it is housed in the electrical equipment section 300.

In FIG. 16, reference numeral 320 designates an electric power switch, 322 a start switch, and 324 a parameter-selecting switch.

When measuring, a required measuring force is applied to the stylus 202 by adjusting an amount of inserting the spring pressing screw 242 according to an object to be measured. Moreover, according to the object to be measured, it is, as shown in FIGS. 13 to 15, selected whether the driving mechanism 100 is used in such a manner that it is housed in the electrical equipment section 300, or the driving mechanism 100 is independently used in such a manner that it is separated from the electrical equipment section 300. For example, when measuring an inner surface of a small hole, the measurement is made with the driving mechanism 100 removed because the electric equipment section 300 is obstructive, and with the driving mechanism 100 united to the electric equipment section 300 in the other cases.

In concrete terms, the stylus 202 of the detector 200 is contacted to a surface to be measured, the electric power switch 320 is turned on, and the start switch 322 is pressed. Then, the control circuit 312 causes the gear motor 118 to rotate through the driving circuit 310. When rotation of the gear motor 118 causes the feed screw 114 to rotate, the slide block 108 is moved in an axial direction of the feed screw 114; therefore, the stylus 202 of the detector 200 is displaced up and down according to the surface roughness of an article to be measured.

The displacement of the stylus 202 is converted into an electrical signal by the detector 200, then transmitted to the signal processing circuit 304 through a cable 302.

Thereafter, the processed signal is transmitted to the measuring circuit 306. The measuring circuit 306 obtains the surface roughness based on the signal transmitted from the signal processing circuit 304 according to the parameters instructed from the control circuit 312, and let it, displayed on the digital display 308.

According to the present embodiment, the slide block 108 is rectangular and elongated in an advancing and retreating direction of the detector, and the main shaft 104 is passed through two of the fore and the rear end; therefore, a long span is realized by a reduced-weight and simple construction. Furthermore, not only the main shaft 104 but also the short sub shaft 106 are provided to press the detector mount 108A of the slide block 108, which provides, particularly, a high stability. Moreover, the sliding member may be any suitable shape. Besides, the shape of the columnar guide is not limited to a circle column, and the number of the columnar guides is not limited to two. The shape of the sliding member can be shaped like a prism, only one main shaft can be provided, or more than two of long sub shafts can be provided.

In this embodiment, the wire to the driving-side connector 154 is made of the flexible printed circuit substrate 138, thereby causing the bend portion to be stabilized, which makes a load applied to the bend portion, and hence the load to the connector 154 constant. This prevents the sliding condition of the sliding member from undergoing the influence due to the fluctuation of the load by the wire bending, which results in the straightness of the movement of the detector and the reproducibility. Also, this makes the individual wire useless, reduces the number of the components, and makes the wiring work easy. Moreover, the wire to the driving-side connector can be made of a usual lead wire.

According to this embodiment, the fulcrum-leaf. spring 230 is shaped like a simple rectangle, which makes the construction simple. Moreover, the plate thickness of the fulcrum leaf spring may be changed according to an object to be measured, or a plate width-wise direction notch 230A may be disposed at a fulcrum location of the center portion to decrease the width, as shown by a variant example in FIG. 17, a thin thickness portion wall 230B may be provided, like another variant example shown in FIG. 18, or there may be provided a hollow 230C which weakens the resilient force of the vicinity of the fulcrum compared with the other portion, like further variant example shown in FIG. 19.

Further, the leaf spring 230 may be bent in such a direction as to press the coil spring 240, thereby causing a reaction force against the urging force by the coil spring 240 to be applied to the coil spring 240. Therefore, the balance between the reaction force and the urging force by the coil spring enables a measuring force to be applied to the stylus 202. In this case, a minute measuring force is so easily. adjusted to cope with the difference of the measuring force according to the radius of curvature of a leading end of the stylus, or the difference of the weight of the stylus arm as an option such as the deep groove-use detector.

Figure 20:
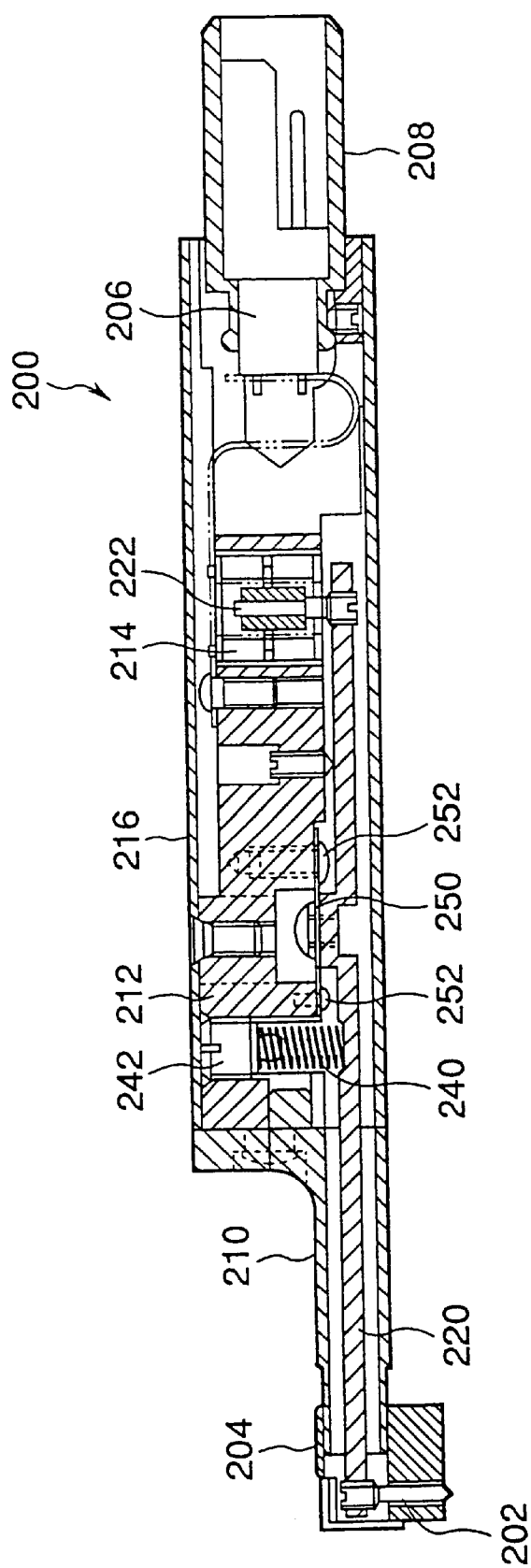
FIG. 20 is a longitudinal sectional view showing the construction of a detector according to a second, embodiment of the invention.
Figure 21:
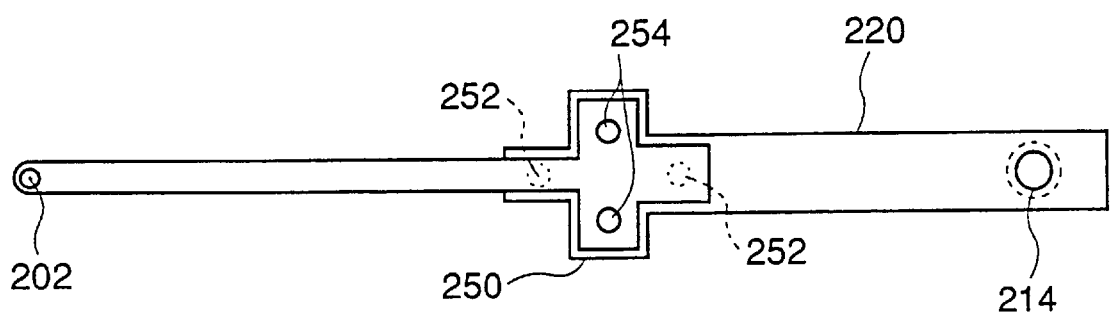
FIG. 21 is a bottom view of a stylus arm of the second embodiment.
Figure 22:
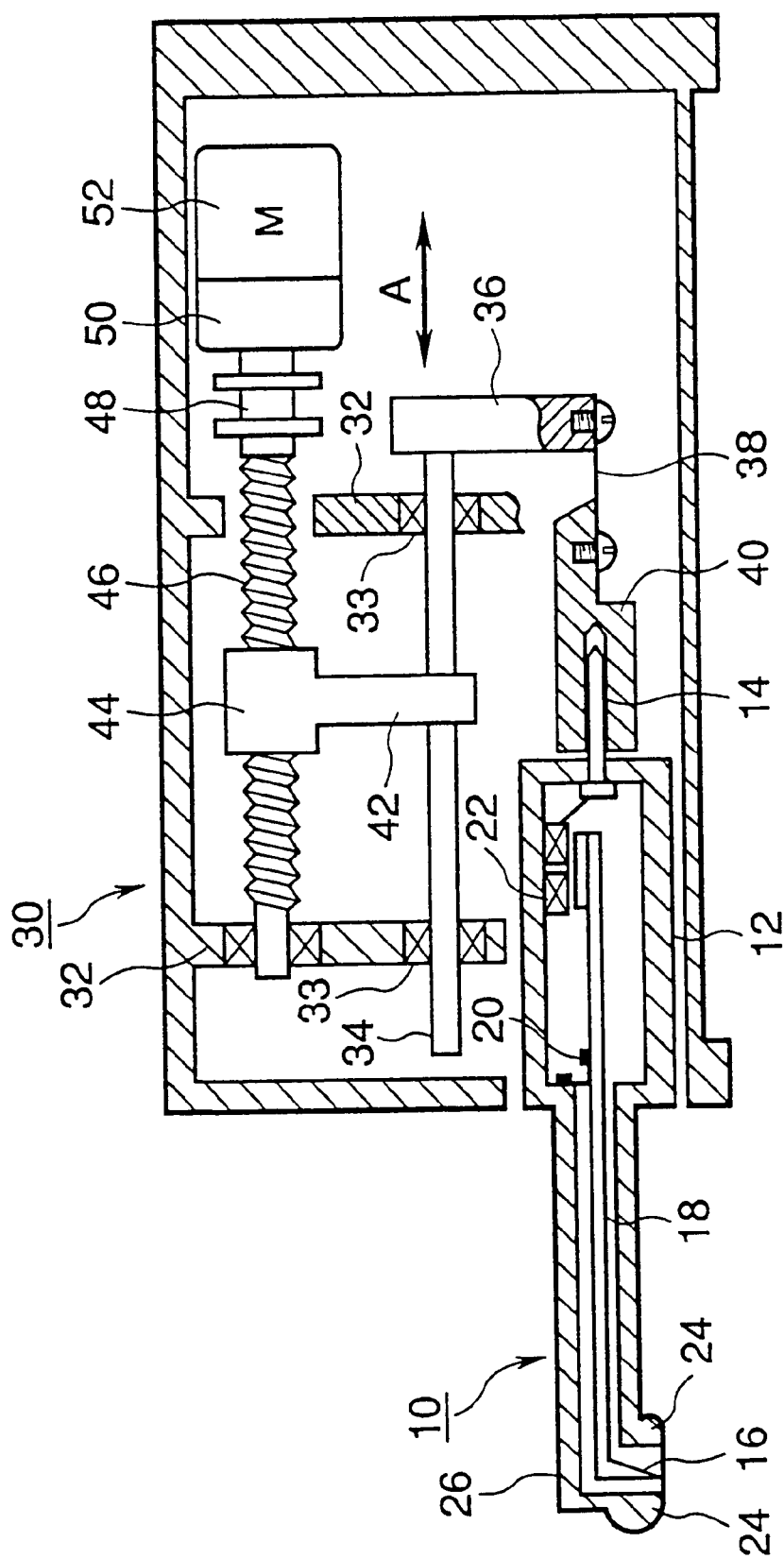
FIG. 22 is a sectional view showing the construction of a stationary surface roughness measuring device which is proposed in Japanese Patent Publication (Kokoku) No. 4-60523.
Figure 23:
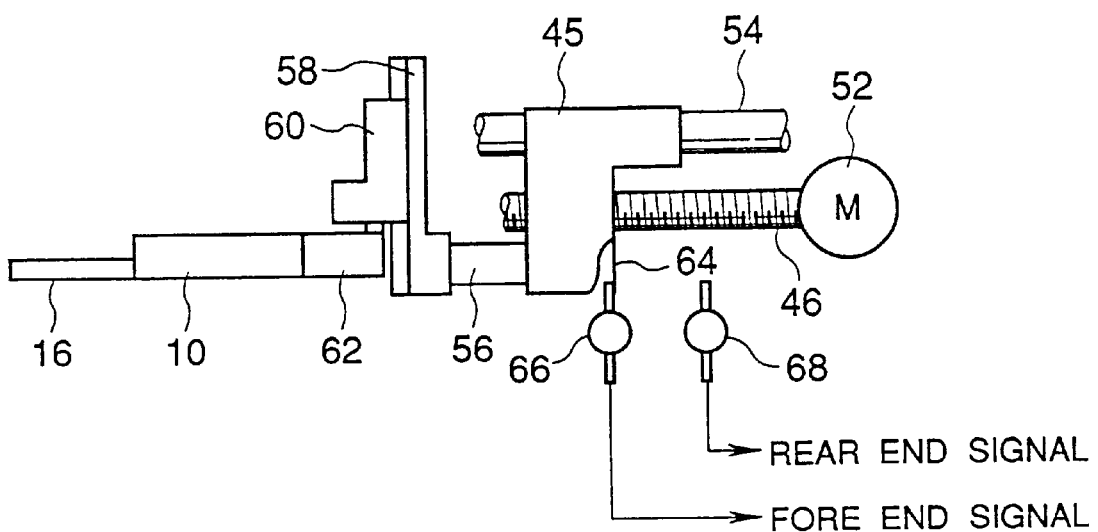
FIG. 23 is a front view showing the construction of a main part of a driving mechanism of a stylus type measuring device which is proposed in Japanese Provisional Patent Publication (Kokai) No. 61-155901 by the applicant.
Figure 24:
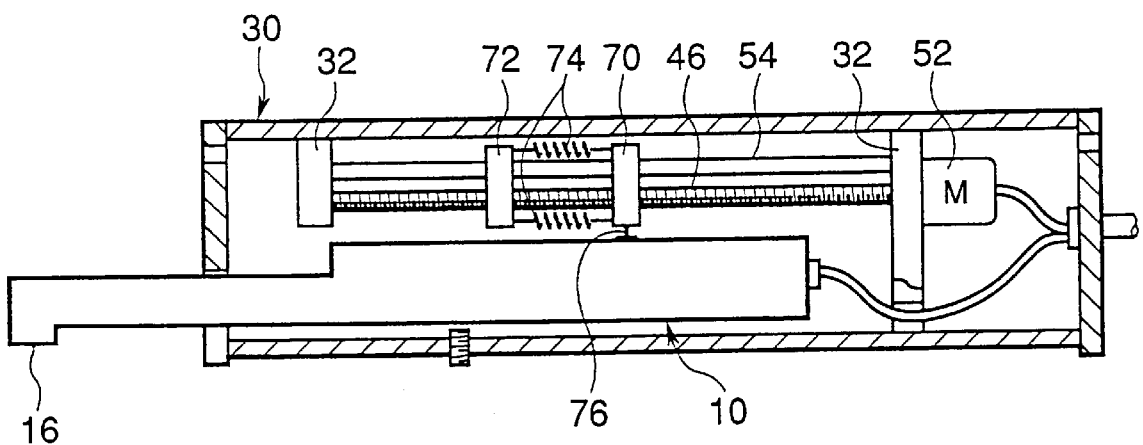
FIG. 24 is a front view showing the construction of a main part of a driving mechanism of a surface roughness measuring device which is proposed in Japanese Utility model Publication (Kokai) No. 4-24408 by the applicant.
Figure 25:
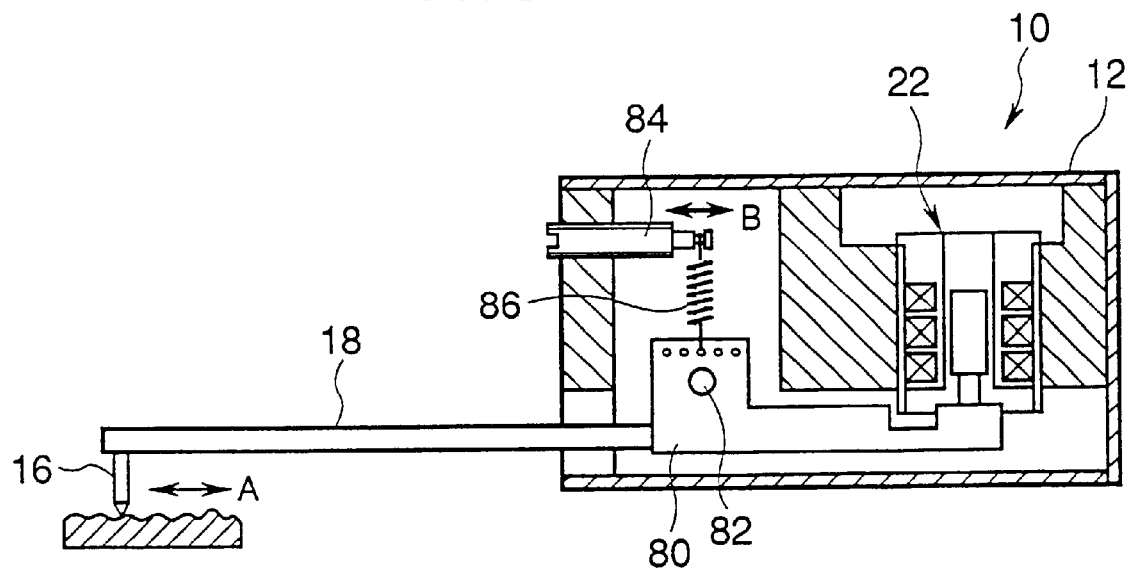
FIG. 25 is a longitudinal sectional view showing the construction of a detecting device for use in a surface roughness measuring device which is proposed in Japanese Patent Publication (Kokoku) No. 3-30084.
Figure 26:
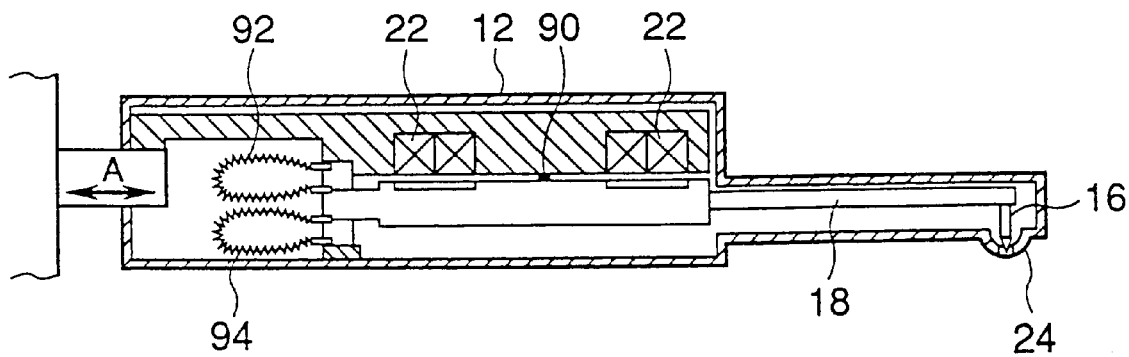
FIG. 26 is a longitudinal sectional view showing the construction of a stylus type surface roughness measuring device which is proposed in Japanese Provisional Utility Model Publication (Kokai) No. 1-104504 by the applicant.

Further, the leaf spring may be made of a small resilient thin plate, or of a cross-like leaf spring like a second embodiment shown in FIG. 20 (longitudinal sectional view) and FIG. 21 (bottom view of a stylus arm), and then its both ends may be fixed to the main frame 212 by screws 252, and its center may be fixed to the stylus arm 220 by screws 254.

According to this embodiment, the both ends of the leaf spring 250 are fixed to the frame 212; therefore, particularly, the fulcrum position is stable.

In any one of the embodiments, the invention is applied to the stationary portable surface roughness measuring device, the application of the invention is not limited thereto, and hence the invention can be applied to, for example, contour measuring devices, and surface roughness proves used for three-dimensional coordinates measuring machines.

Although certain preferred embodiments have been shown and described, it should be understood that many changes and modifications may be made therein without departing from the scope of the appended claims.

What is claimed is:

1. A surface property measuring device comprising a detector having a stylus, and a driving mechanism for causing said detector to advance and retreat along a surface to be measured, wherein said device comprising:

columnar guides fixed to a frame of said driving mechanism in parallel with an advancing and retreating direction of said detector;

a sliding member having a portion shaped like an annular rectangular block sliding on one of the columnar guides, said sliding member has at least one fore engaging location and at least one rear engaging location, is elongated in said advancing and retreating direction of said detector, and this columnar guide is inserted through the at least one fore engaging location and the at least one rear engaging location, another of the columnar guides being pressed by pressing members interaction with said sliding member; and driving means for causing said sliding member to advance and retreat along said columnar guides, and wherein said detector is attached to said sliding member.

2. A surface property measuring device as claimed in claim 1, wherein said detector is detachable to said driving mechanism through connectors, wherein a driving side-connector is fixed to said sliding member.

3. A surface property measuring device as claimed in claim 2, wherein at least a portion of a cable, which connects said driving mechanism with said detector, to be deformed due to a movement of said detector comprises a flexible printed circuit board.

4. A surface property measuring device as claimed in claim 1, wherein the detector further comprises a stylus arm having a leading end, the stylus being disposed in a vicinity of the leading end of the stylus arm, wherein a fulcrum of said stylus arm is made of a thin plate, and a force, which is directed in such a direction as to cause said stylus to contact the surface to be measured, is applied to said stylus arm by means of a coil spring which is independent of said thin plate.

5. A surface property measuring device as claimed in claim 4, wherein said thin plate has different elastic force in the vicinity of said fulcrum than at the other portions thereof.

6. A surface property measuring device as claimed in claim 5, wherein said thin plate is weaker in elastic force in the vicinity of said fulcrum than at the other portions.

7. A surface property measuring device as claimed in claim 4, wherein said thin plate is shaped like a cross and fixed to a frame of said detector at opposite end portions thereof, an a stylus arm is fixed to a center portion of said thin plate.

8. A surface property measuring device as claimed in claim 7, wherein said thin plate comprises a leaf spring.

9. A surface property measuring device as claimed in claim 8, wherein said leaf spring provides a reaction force which is opposed to an urging force by said coil spring, and the balance between said reaction force and said urging force by said coil spring provides a measuring force to said stylus.

10. A surface property measuring device as claimed in claim 4, wherein an urging force of said coil spring is adjustable.

\* \* \* \* \*